United States Patent [19]

Frank

[11] 4,058,200
[45] Nov. 15, 1977

[54] ORIENTING AND ALIGNING MOVING GLASS SHEETS

[75] Inventor: Robert G. Frank, Murrysville, Pa.

[73] Assignee: PPG Industries, Inc., Pittsburgh, Pa.

[21] Appl. No.: 598,298

[22] Filed: July 23, 1975

[51] Int. Cl.² .......................................... B65G 47/24
[52] U.S. Cl. .................................. 198/382; 198/411; 65/62; 65/273
[58] Field of Search ............... 198/31 AA, 110, 106, 198/107, 218, 221, 282, 283, 29, 382, 383, 411, 345; 271/248; 65/62, 273, 275, 286, 323

[56] References Cited

U.S. PATENT DOCUMENTS

| 1,428,883 | 9/1922 | Emerson | 198/283 |
|---|---|---|---|
| 1,839,375 | 1/1932 | Covey | 198/24 |
| 2,437,214 | 3/1948 | Tremblay | 198/106 A |
| 2,547,791 | 4/1951 | Smith et al. | 198/31 AA |
| 2,828,877 | 4/1958 | Webster | 198/218 X |
| 2,856,741 | 10/1958 | Hartman | 198/29 X |
| 2,878,684 | 3/1959 | Kerfoot | 198/110 X |
| 3,040,867 | 6/1962 | Posten et al. | 198/31 AA |
| 3,598,221 | 8/1971 | Klimaschka | 198/106 X |
| 3,655,070 | 4/1972 | Haydu | 198/218 X |
| 3,701,643 | 10/1972 | Frank | 198/283 X |
| 3,827,547 | 8/1974 | Nixon | 198/131 X |

Primary Examiner—Evon C. Blunk
Assistant Examiner—Richard K. Thomson
Attorney, Agent, or Firm—Edward I. Mates

[57] ABSTRACT

Apparatus for aligning and orienting moving glass sheets immediately prior to their treatment. This invention is especially suitable for use with glass sheets heated while conveyed through a furnace on a roller conveyor where the glass becomes misaligned or misoriented prior to entry into a shaping station. However, the invention is also capable of use with any type of conveyor defining an enclosed conveyor path for said glass sheets where the glass is liable to lose its orientation and/or alignment and must be oriented and/or aligned preparatory to processing and is also suitable to orient and align rigid sheets other than glass.

The apparatus includes a pair of truncated conical rollers which engage the edge of the glass sheet and, due to their shape, substantially reduce chipping thereof. These rollers are mounted on a carriage in a manner to permit lateral movement relative to the carriage by cams. The carriage reciprocates along the path in a manner to move with the sheets. As the carriage returns, the glass engaging rollers are raised and laterally retracted so as to avoid contact with the oriented glass sheet.

12 Claims, 9 Drawing Figures

ORIENTING AND ALIGNING MOVING GLASS SHEETS

BACKGROUND OF THE INVENTION

1. Field of the Invention

The present invention relates to the treatment of moving glass sheets which require proper orientation and/or alignment prior to certain processing, such as shaping glass sheets or coating a selected portion where the portion of the glass to be coated must be aligned properly in a predetermined manner with respect to a coating means. The present invention is adapted for a mass production operation, and is adpated to handle sheets moving at a faster speed than the apparatus of my earlier U.S. Pat. No. 3,701,643.

An illustrative embodiment of the present invention will describe the present invention relative to a continuous shaping of discrete glass sheets by the roll forming method. However, it will be understood that treatments other than bending may be applied to discrete glass or other rigid sheets handled according to the present invention.

2. Description of the Prior Art

U.S. Pat. No. 3,445,672 to Alex G. Dompkowski transports deformable glass sheets from a shaping station to a quenching station using a reciprocating transfer carriage provided with moving fingers that are retracted to provide clearance for a glass sheet to enter the shaping station along a roll conveyor and be engaged by shaping molds that lift the glass off the roll conveyor during shaping. The fingers extend to engage the bent glass for transfer with the carriage to the quenching station and retract to dispose the glass on to the roll conveyor at the quenching station.

U.S. Pat. No. 3,265,484 to Ritter discloses glass engaging members that move between a raised position and a lowered position. In the lowered position, the glass engaging surfaces are disposed in the plane of the path taken by a glass sheet into a shaping station in order to engage the leading edge of the glass sheet being carried along the path to correctly position the sheet relative to the mold parts just as the conveyor movement is halted or just as the glass contacts the glass engaging members or the bending cycle is timed so that the lower mold part lifts the glass sheet off the conveyor at the same time as the sheet engages the members.

U.S. Pat. No. 3,332,759 to McMaster et al discloses pivotable glass edge support devices for engaging a side edge and a lower surface of a glass sheet throughout the passage of the latter through a heating chamber.

U.S. Pat. No. 3,545,951 to Nedelec simultaneously applied glass contacting fingers that are operated together to engage each side edge as well as the leading and trailing edges of the flat sheet at a glass shaping station. All the actuating mechanisms for positioning are located internally and are not readily accessible for repair.

U.S. Pat. No. 3,701,643 to Frank represents an improvement over the previous patents by incorporating carriages provided with a pair of glass edge engagement members whose purpose is to align rather than support a moving glass sheet while the moving sheet is conveyed along an enclosed conveyor leading to a glass processing station. The carriages are reciprocated in unison between upstream and downstream positions in paths exterior to the enclosed conveyor on opposite sides of the glass sheet at the same speed as the glass in the direction of glass sheet movement while the glass engaging members move into glass engaging positions limited by stop means to provide at least two longitudinally spaced points of contact along each of the opposite longitudinal side edges of the glass sheets being aligned and oriented properly preparatory for entry into a glass processing station such as a glass shaping station.

If the glass is not in proper orientation with respect to the shaping molds, the curvatures imparted to the glass will be skewed with respect to the dimensions of the glass. If the glass is not aligned properly in a transverse direction relative to the conveyor rolls, the only kinds of curvature that can be imparted without departure from tolerance to the glass would be a cylindrical or spherical type of curve.

The Frank patent provides structure for orienting and aligning glass sheets by momentary engagement in which the actuating means for the elements that engage the glass are located in easily accessible position outside the heated enclosed atmosphere of a furnace to minimize the need for maintenance and provide easy access for maintenance when needed. The Frank patent also provides means to return the carriages to the upstream position with the glass engaging members retracted in time to receive the next glass sheet in the series.

While the glass sheet orienting and aligning apparatus of the Frank patent provided suitable operation during the early days of mass production of shaped glass sheets by the roll forming process, further improvements in the roll forming process making possible a more rapid rate of production made it necessary to apply further improvements to the sheet orienting and aligning apparatus. Also, it became necessary to treat glass sheets having more complicated outlines than those treated in the earlier days of the roll forming process. As the production speed increased and the complexity of outline of treated glass sheets became more severe, it became more difficult to retract the glass engaging members rapidly enough to insure their clearance from the remainder of the glass edge as the rear end portions of the properly oriented and aligned glass sheets passed beyond the orienting and alignment station into the roll forming station.

SUMMARY OF THE INVENTION

The present invention provides further improvements in the glass orienting and aligning art over those incorporated in the invention of U.S. Pat. No. 3,701,643 to Frank. In the first place, the present invention incorporates a single carriage disposed to one side of the heating furnace near its exit rather than two carriages. This feature reduces the need to synchronize the movement of a pair of carriages and their respective glass engaging members and also allows glass sheets having a slightly greater width than specifications, but still within tolerance, to be oriented and aligned without marring one or both edges of slightly wider glass sheets.

Another feature of the present invention involves providing means to lift the glass engaging members above the plane occupied by the glass sheets after the latter are oriented and aligned. Thus, the carriage may return to its upstream position with its glass engaging members poised in a horizontal plane above the upper surface of the glass sheet passing through the orienting and alignment station while the glass engaging members retract. This feature is important because it takes less time to lift the glass engaging members a vertical distance more than the glass sheet thickness (about 3 to 6 millimeters) than it takes to retract the glass engaging members in the plane of glass sheet support sufficient to compensate for wider portions or convexly offset portions along the edge of the glass sheet that must be cleared before the wider or convexly offset portion passes the line of movement for the retracting glass engaging member.

Another feature of the present invention is the replacement of disc shaped glass engaging members with glass engaging members in the form of truncated cones having their peripheral surface forming a small angle, preferably 3° to 5°, with the axis of the cone. The rounded edges of the treated glass sheets tend to wear grooves into the periphery of disc shaped members. As the grooves become deeper, they tend to hold the moving glass sheets against the conveyor rolls, and to chip the edge of the glass, and to mark the lower glass sheet surfaces near the edges. When the glass engaging members are in the form of truncated cones, there is no force tending to wedge the glass edge between the glass engaging member and the conveyor roll, even when the glass engaging member begins to wear. Therefore, substituting glass engaging members of truncated conical configuration for discs reduces chipping and marking of the glass sheets during their orientation and alignment.

Still another feature of the present invention is the provision of a positive cam and gate device to coordinate the movement of the glass engaging members with movement of the carriage.

An illustrative, preferred embodiment of relatively simple construction will be described in terms of handling glass sheets. It will be understood, however, that this invention may be used in handling rigid sheets other than glass sheets, if so desired.

DESCRIPTION OF A PREFERRED EMBODIMENT

The apparatus of the present invention is especially designed to provide proper alignment and orientation of glass sheets immediately before they enter a roll forming station of the type depicted in U.S. Pat. No. 3,891,420, the disclosure of which is incorporated herein by reference.

Figure 1:
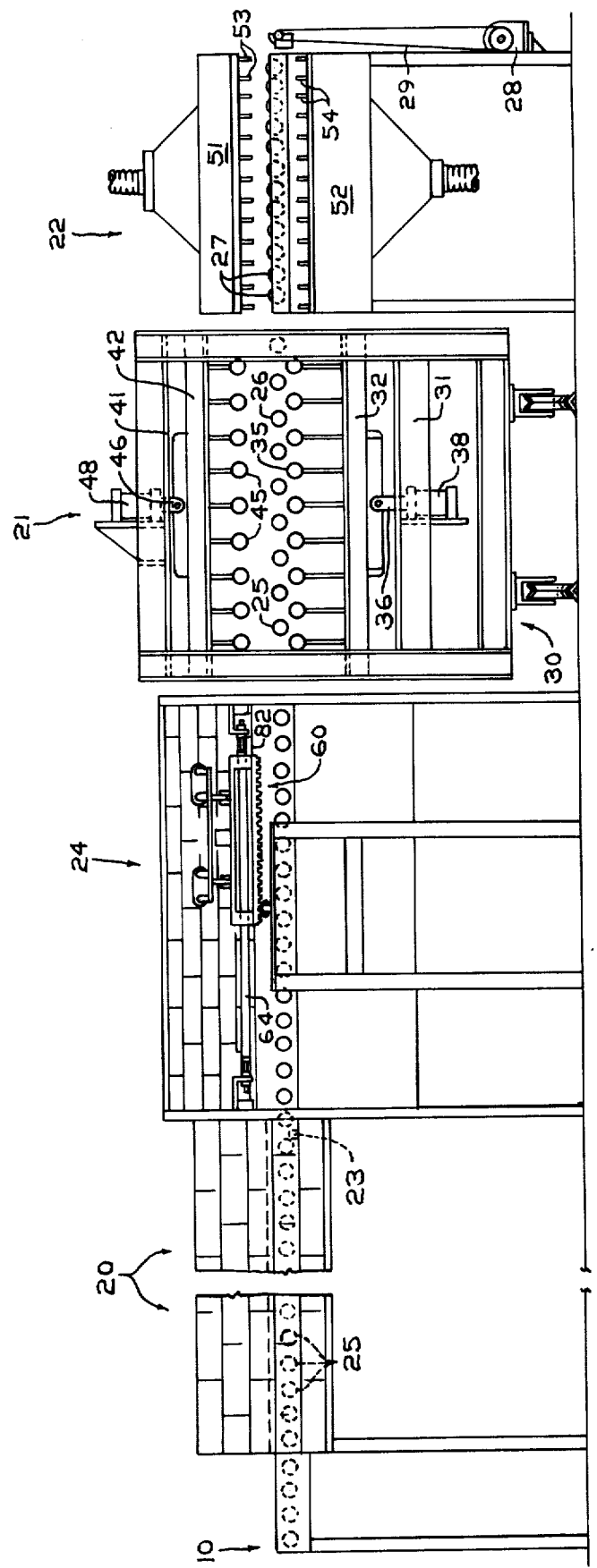
FIG. 1 is a longitudinal elevation of a roll forming apparatus for shaping moving glass sheets that comprises a furnace used to prepare glass sheets for shaping by the roll forming method and incorporates along an essentially straight line conveyor and orienting and alignment station constructed according to the present invention.

Referring to the drawings, FIG. 1 discloses a side view of a roll forming apparatus of the type depicted in U.S. Pat. No. 3,891,420 to Robert G. Frank modified to incorporate a preferred embodiment of the present invention. The roll forming apparatus of the present invention comprises a horizontal conveyor system 10 extending from a sheet loading station 12 through a tunnel-type heating furnace 20, a sheet forming station 21 of the roll-forming type, and a cooling station 22 of the type also depicted in the aforesaid Frank patent. A series of glass sheets is conveyed along said conveyor system from an upstream location at the sheet loading station 12 to a downstream location at an unloading station (not shown) beyond the cooling station 22.

A glass sensing device 23 of the type well known in the art, such as an ultraviolet or infrared sensing device, is located near the exit of the furnace 20 upstream of a sheet orienting and alignment station 24 to detect the passage of the leading edge of a glass sheet to actuate operation of the sheet orienting and alignment station 24 to perform its sheet orienting and alignment function.

The conveyor system comprises a series of rigid, longitudinally spaced, horizontally extending, conveyor rolls 25 disposed in closely spaced relation (about 76 mm) throughout the length of the furnace for conveying a succession of glass sheets G therealong. The conveyor rolls disposed in the furnace are preferably made of stainless steel and are of cylindrical configuration and rigid, and preferably covered with a ceramic coating harmless to heat-softened glass, such as zirconium silicate.

An additional set of conveyor rolls comprising additional rigid stainless steel rolls 25 located in the entrance end portion of the sheet forming station 21, followed by conveyor rolls 26 which are flexible to conform to the shape of shaped sheets located in the exit end portion of the sheet forming station 21 are located in spaced apart relation (about 178 mm) thoughout the length of the sheet forming station 21. The arrangement of rigid and flexible conveyor rolls in the sheet forming station 21 is described and claimed in copending U.S. Pat. No. 3,934,996, of Robert G. Frank and the description of said rolls in said patent is incorporated herein by reference. Additional conveyor rolls 27 of the adjustable type found suitable for use in the cooling station 22 and which are of the type described in either U.S. Pat. No. 3,807,982 of George R. Claassen and Rudy Canonaco or U.S. Pat. No. 3,807,546 or Rudy Canonaco are disposed in the cooling station 22, or at least in the entrance portion of the cooling station.

The conveyor rolls 25, 26 and 27 are arranged to form different sections of the conveyor system. Each conveyor section is driven off a drive motor 28 through a drive chain 29 that interconnects a sprocket on the drive motor shaft with a sprocket on a conveyor roll shaft. A separate longitudinally extending drive shaft (not shown) is provided with bevel gears (not shown), one to mesh with a bevel gear for each conveyor roll 25, 26 or 27 to drive each conveyor roll of the conveyor section off the longitudinally extending drive shaft for its respective conveyor section as shown only for the conveyor section for the cooling station 22 in FIG. 1. If desired, certain conveyor rolls of one section may be disconnected by clutches from the motor driving one conveyor section for a driving connection to a motor driving another conveyor section, in a manner well known in the art. Also, the conveyor sections may be further subdivided, or the entire conveyor system may be made as one continuous section off a single drive motor and a single longitudinally extending drive shaft provided with bevel gears, as desired. Further details of the conveyor system may be obtained from U.S. Pat. No. 3,891,420 of Robert G. Frank.

The furnace 20 comprises a tunnel-type passageway through which flat glass sheets are conveyed with their lower surface supported by successive rigid conveyor rolls 25. The furnace has heating elements which may be electrical resistance heaters supported by the roof and the floor of the furnace so that the glass sheets may be irradiated as they are conveyed through the furnace to arrive at the furnace exit at a suitable temperature for shaping by roll forming and tempering.

The sheet forming station 21 included in apparatus according to the present invention comprises an open reinforced frame structure 30 comprising a lower platform 31 which supports a vertically movable lower forming roll support housing 32 and an upper platform 41 which supports a vertically movable upper forming roll support housing 42. Both forming roll support housings are oriented in a horizontal plane parallel to the horizontal plane of support provided by the conveyor system.

The lower forming roll support housing 32 comprises a pair of sets of brackets spaced apart about 178 millimeters from one another in the direction of glass movement through the sheet forming station 21.

The brackets are adjustably positioned in a vertical direction to support a series of common shafts on which is rotatably mounted one of a set of lower segmented forming rolls (either in alignment with one another either in a horizontal line in a plane parallel to the plane of support provided by the upper tangent common to the horizontal conveyor rolls 25, 26 and 27 of the conveyor system or in an oblique line or in adjustment along a curved line defined by the position of each bracket along each of the two longitudinally extending, spaced, vertical planes or any combination of horizontal, oblique or curved lines as dictated by the nature of the shape to be imparted to the glass sheets being shaped).

Each of the segmented forming rolls 35 is capable of vertical adjustment relative to the lower forming roll support housing as depicted in said U.S. Pat. No. 3,891,420 to Robert G. Frank in greater detail.

The lower forming roll support housing 32 is rigidly attached to a vertically movable rod 36 to a lower piston 38. The latter is supported by the lower platform 31 of the open reinforced frame structure 30. A rigid structure is provided for the lower forming roll support housing 32 so that the set of lower forming rolls 35 supported by said lower forming roll support housing 32 moves in unison in response to actuation by the piston 38.

The open reinforced frame structure 30 also movably supports a set of upper sheet forming rolls 45, each of which is vertically adjustable relative to the upper forming roll housing 42 by attaching the latter to the free lower end of a vertically movable rod 46 of an upper piston 48. The upper piston is supported on the upper platform 41 forming part of the reinforced frame structure 30.

In vertical planes intermediate the vertical planes occupied by the conveyor rolls 25 and 26 at the sheet forming station 21, and in alignment with the vertical planes occupied by the lower set of segmented forming rolls 35, the upper forming roll support housing 42 supports the set of upper segmented forming rolls 45. Each upper segmented forming roll comprises a plurality of segments mounted on a straight upper common shaft carried by a pair of vertically adjustable brackets similar to those associated with the set of lower sheet forming rolls 35. The shape of each segment of each upper forming roll 45 is complementary to the shape of the corresponding segment of its corresponding lower forming roll 35.

All the upper segmented rolls 45 are in alignment along an upper surface and the lower segmented rolls 35 are aligned along a lower surface parallel to said upper surface. When piston 38 is extended upwardly, the segmented rolls 35 are lifted in unison to positions above the horizontal plane occupied by the tangent common to the upper portion of the circumferences of the conveyor rolls 25 and 26 in the sheet forming station. Each vertically aligned pair of rotating upper and lower forming rolls engages different engages different increments of a heat-softened glass sheet moving through oll-forming station when the piston 38 is extended upward a sufficient distance to lift the lower segmented forming rolls 35 into positions of rolling engagement against the undersurface of the glass sheet and forcing the upper surface of the glass sheet into rolling engagement against the upper set of forming rolls 45. Thus, the rotating rolls impose bending forces on different longitudinal increments of the traveling glass sheet simultaneously.

The composition of the roll segments is very important to insure proper operation of the roll forming apparatus with minimum glass breakage or glass marking. The material must have a low thermal conductivity to minimize thermal shock on the hot glass when the latter engages the relatively cold shaping rolls. The rolls must have a low coefficient of thermal expansion over a wide range of temperatures of approximately 350° C. from room temperature to an elevated temperature that the forming rolls attain on periodically contacting hot glass. They must be of a composition that does not react chemically with glass, that is durable over said wide temperature range, and is readily shaped or machined to complex contours. To meet the aforesaid requirements, the segments of the forming rolls 35 and 45 are composed of an asbestos cement of alumino-silica composition sold by Johns-Manville under the trademark of TRANSITE.

While it is possible to operate the sheet forming apparatus so that only the lower set of segmented forming rolls 35 are moved vertically toward and away from the corresponding upper set of segmented forming rolls 45 to shape the glass sheets, greater flexibility is provided when both the upper forming rolls 45 and the lower forming rolls 35 are provided with vertical movement. However, it is necessary that the lower forming rolls 35 retract in the flat glass receiving position to a position below the horizontal plane occupied by the common tangent to the upper surfaces of all of the conveyor rolls 25 and 26 in the sheet forming station, as depicted in FIG. 1, and that the lower forming rolls 35 occupy an upper position wherein the entire upper surfaces of the forming rolls 35 is above the common plane of the conveyor rolls 25 and 26 during a sheet forming operation.

In order to minimize marking of the glass surface due to rubbing by portions of the shaping rolls whose peripheral velocity differs sufficiently from the speed of the glass sheet moving through the roll forming apparatus to cause observable rubbing marks, only selected segments of each segmented forming rolls 35 are driven and the remaining segments of the lower forming rolls are freely rotatable. Likewise, only selected segments of the upper segmented forming rolls 45 are driven, while the remaining segments are freely rotatable. Means depicted in U.S. Pat. No. 3,891,420 to Robert G. Frank is provided to independently control the rotational speed of the upper and lower driven segments. In addition, low friction devices such as those described and claimed in U.S. Pat. No. 3,871,855 to Robert G. Frank are disposed between adjacent segments to minimize friction between adjacent segments.

The cooling station 22 may be of any type of glass tempering or heat-strengthening apparatus that is well known in the art. One type of cooling station that may be used is disclosed in U.S. Pat. No. 3,245,772 to James H. Cypher and Charles R. Davidson, Jr. Preferably, it comprises upper and lower nozzle boxes 51 and 52, respectively, each having a set of longitudinally spaced, elongated slot nozzle openings 53 and 54 extending transversely of the path defined by the portion of the conveyor system that extends through cooling station 22 that includes flexible conveyor rolls 27. The slot openings are preferably about 4.6 millimeters to 6.4 millimeters wide and about 76 millimeters apart in each set and the nozzle openings of one set are about 127 millimeters from the nozzle openings of the other set, and aligned in vertical planes that intersect the spaces between adjacent conveyor rolls 27. The latter have an outer diameter of 50 millimeters or less at their axial ends and decrease in diameter toward their central portion as needed to conform to the shape of glass sheets being conveyed through the cooling station 22. The exact structure of the cooling station forms no part of the present invention and this description thereof is made as brief as possible because any cooling station used to temper glass sheets on a roller hearth may be used in conjunction with the present invention. Pressurized air from blowers (not shown) is supplied to the upper and lower nozzle boxes 51 and 52 for discharge through the nozzle openings 53 and 54 to cool roll formed glass sheets as they are conveyed through the cooling station 22.

If desired, exit doors of the type well known in the art may be included to intermittently close the exit slot openings of the furnace 20 and a similar door at the entrance of the cooling station 22 may be included to intermittently close the opening to the cooling station 22. This minimizes the exposure of the sheet forming station 21 to the hot atmosphere of the furnace 20 at one end and to the cold blasts of the cooling station 22 at the other end.

Proper shaping of a series of glass sheets to conform the latter to the shape desired requires that each glass sheet in turn be oriented and aligned properly with respect to the sheet forming station 21 so that the glass sheets are neither skewed improperly nor misaligned relative to the sheet forming rolls that rotatably engage the heat softened sheets to shape the latter as they pass through the sheet shaping station 21. A previous device for oriented and aligning moving glass sheets was developed and successfully used in commercial operation of roll forming apparatus depicted in U.S. Pat. No. 3,701,644 to Robert G. Frank and provides the subject matter of U.S. Pat. No. 3,701,643 of Robert G. Frank. However, further improvements in the roll forming process has resulted in increased speed of operation which requires a more rapid cycle for the moving glass orienting and aligning mechanism. Furthermore, since the early development of the roll forming process, glass sheets of more complicated outlines than those previously handled have made it imperative to develop glass sheet orienting and aligning apparatus that has the capability of disengagement from the glass sheet edge more rapidly than was required previously so that a glass sheet is not misaligned or misoriented once it is properly oriented and aligned.

The present invention provides more rapid reciprocation of a transfer carriage 60 on which a pair of glass or sheet edge engaging members, namely, an upstream glass engaging member 61 and a downstream glass engaging member 62, are mounted. The transfer carriage 60 is located to one side of the furance 20 at the sheet orienting and alignment station 24. The carriage is provided with a superstructure comprising a pair of apertured end brackets 63 at each end. Their apertures receive a pair of alignment rails 64 extending parallel to the length of the horizontal conveyor system 10. The carriage also carries a longitudinally extending rack 65. The alignment rails 64 are arranged in pairs extending longitudinally between a pair of abutments 66 between which the alignment rails are connected. Each abutment 66 supports a shock absorber 67.

Figure 6:
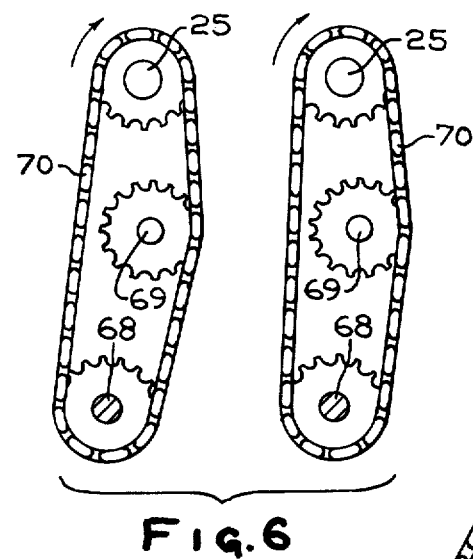
FIGS. 6, 7 and 8 are elevation views of drive mechanisms taken along the lines 6—6, 7—7 and 8—8, respectively of FIG. 5.

A pair of adjacent rigid conveyor rolls 25 in the orienting and alignment station 24 (see FIGS. 3 and 6) is connected to a pair of jack shafts 68 through chain drives 70 entrained around idler takeups 69 to insure a positive drive between each said conveyor roll 25 and its associated jack shaft 68. One of the jack shafts 68 is connected to a forward drive sprocket 71 through a chain drive 72 and an idler sprocket 73. The other jack shaft 68 is connected to a reverse drive sprocket 74 through a chain drive 75 and an idler sprocket 76. Both the forward drive sprocket 71 and the reverse drive sprocket 74 are mounted on a drive shaft 77 which carries a pinion gear 78. The latter engages the rack 65 carried on the under surface of the transfer carriage 60.

Clutches 80 and 81 are connected to successive jack shafts 68 and are arranged so that when clutch 80 is engaged, clutch 81 is simultaneously disengaged, and vice versa. Furthermore, it is possible for both clutches 80 and 81 to be disengaged simultaneously, but never simultaneously engaged. When clutch 80 is engaged, forward drive sprocket 71 is energized to rotate the drive shaft 77 in the direction depicted in FIG. 7 to move the transfer carriage 60 forward from its upstream position to its downstream position at the same speed as the speed of the conveyor rolls 25. Thus, carriage 60 moves forward at the same speed that glass sheets G move through the tunnel-type heating furnace 20. When clutch 81 is actuated, it causes the reverse drive sprocket 74 to rotate in the direction depicted in FIG. 8 to rotate drive shaft 77 in the opposite direction from that of FIG. 7 to return the transverse carriage 60 to its upstream position.

Figure 8:
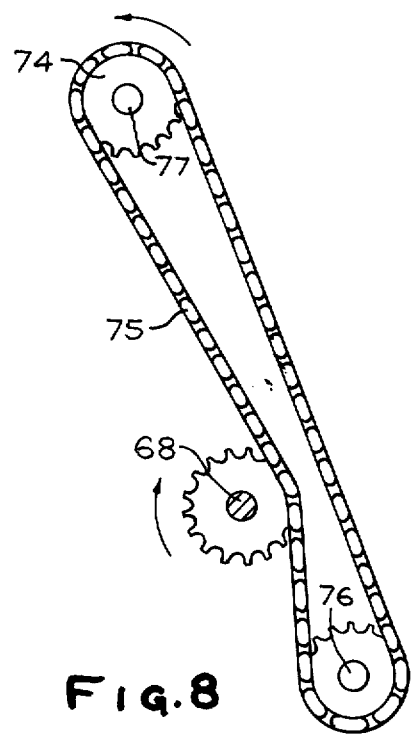
Figure 7:
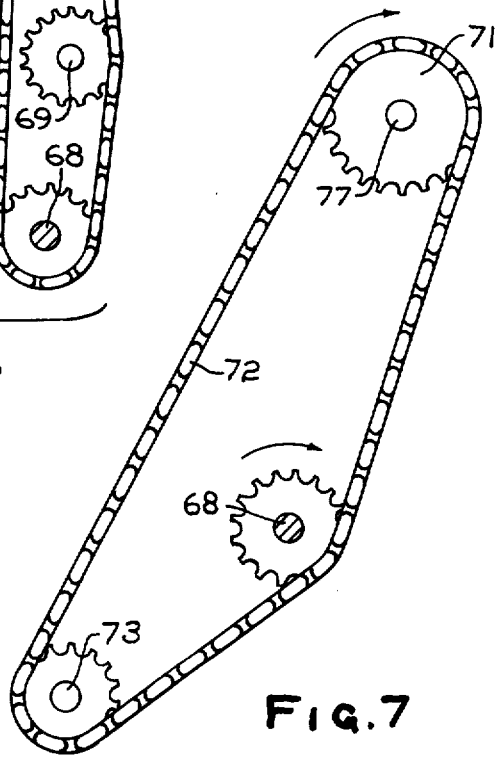

It is noted by comparison of FIG. 7 and 8 that the forward drive sprocket 71 has approximately twice as many teeth as the reverse drive sprocket 74. This arrangement causes the transfer carriage 60 to move from its downstream position to its upstream position at approximately twice the speed of its movement in the downstream direction. This rapid return movement enables the apparatus to handle more sheets per unit time than when the carriage 60 returns to its upstream position at the same speed as its speed of downstream movement.

Figure 2:
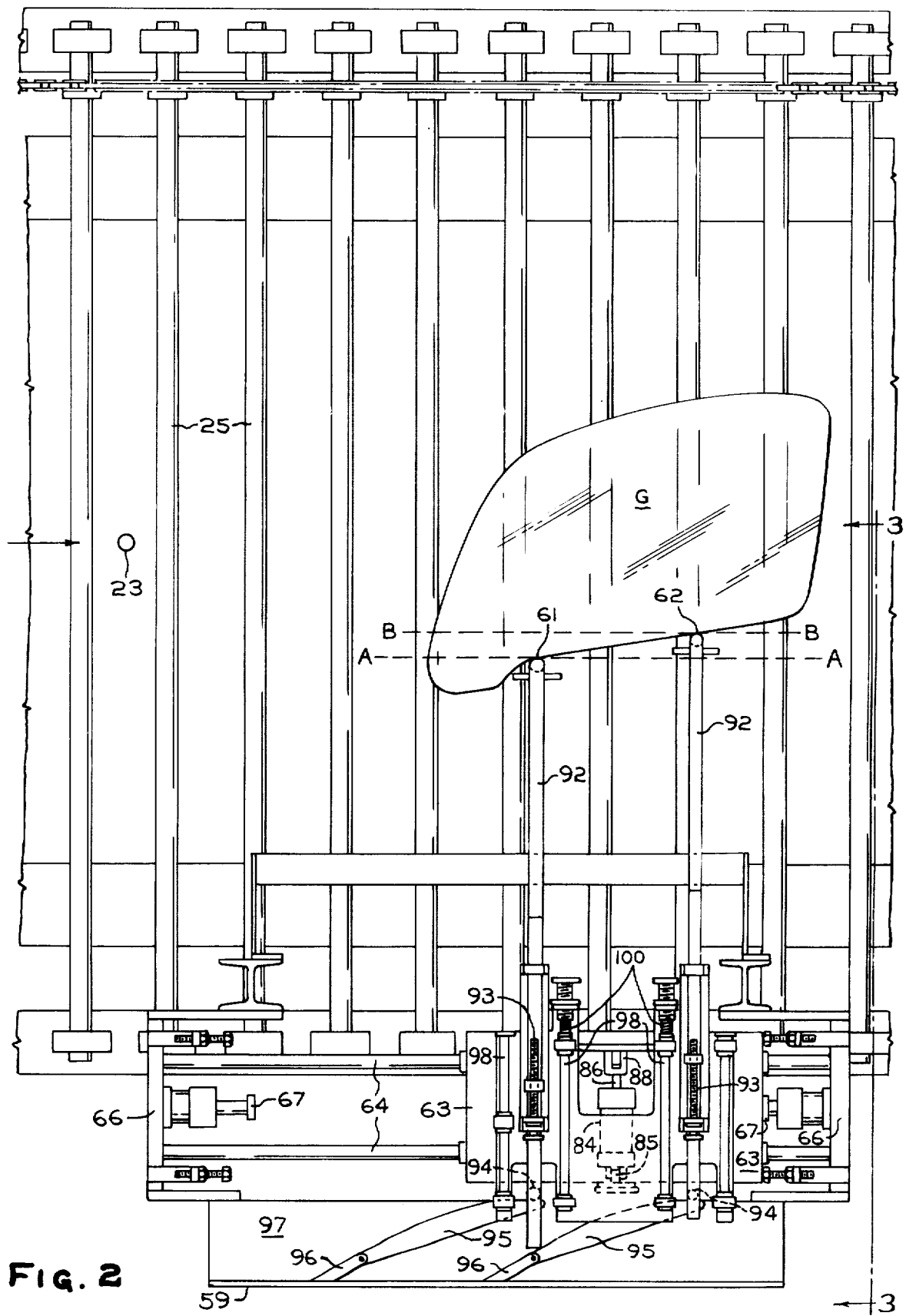
FIG. 2 is a plan view in much larger scale than that of FIG. 1 of the alignment mechanism conforming to the present invention.
Figure 3:
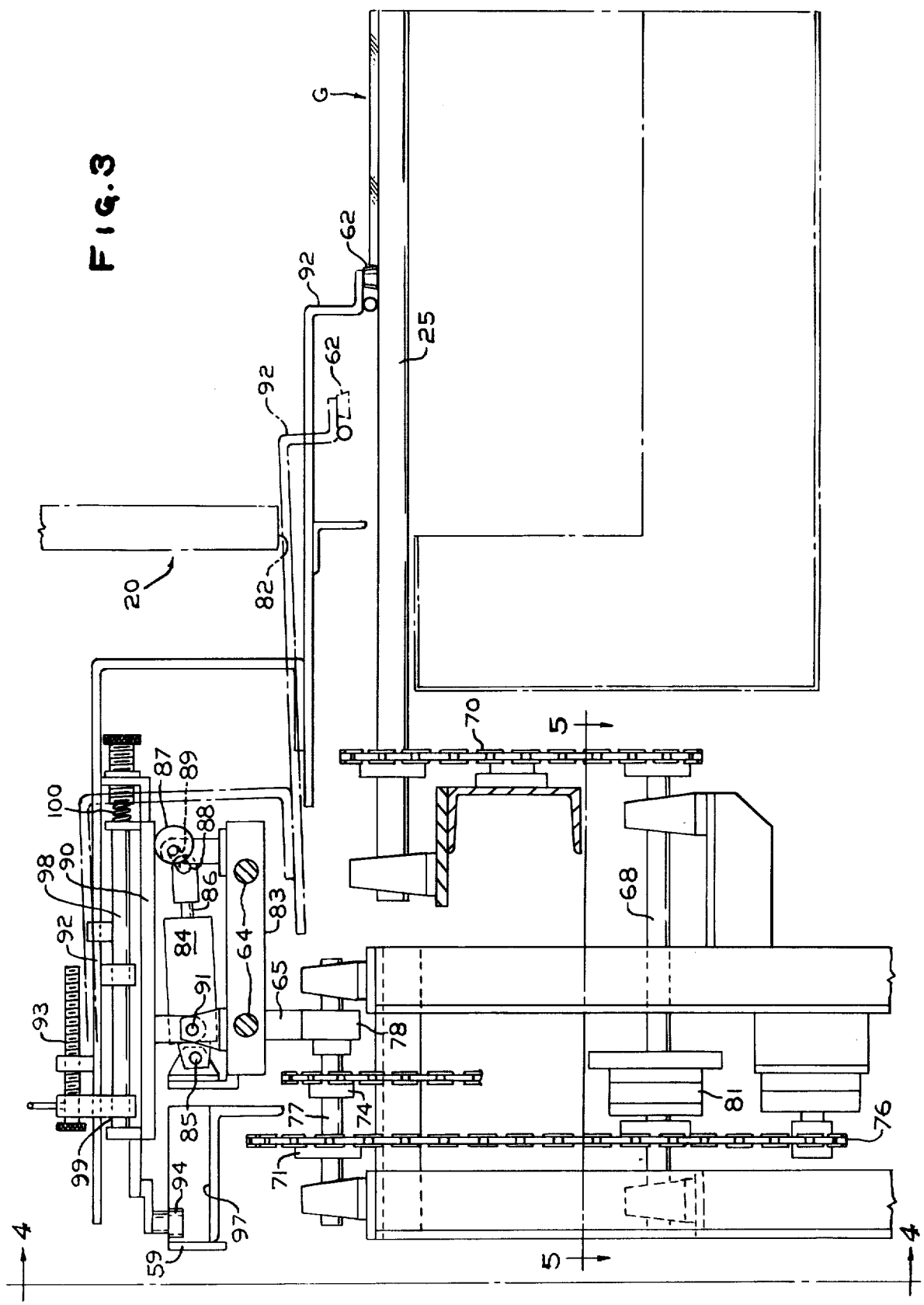
FIG. 3 is a transverse view taken along the lines 3—3 of FIG. 2 showing how a glass aligning member is capable of being rasied and lowered between the glass engaging and the glass disengaging position.
Figure 4:
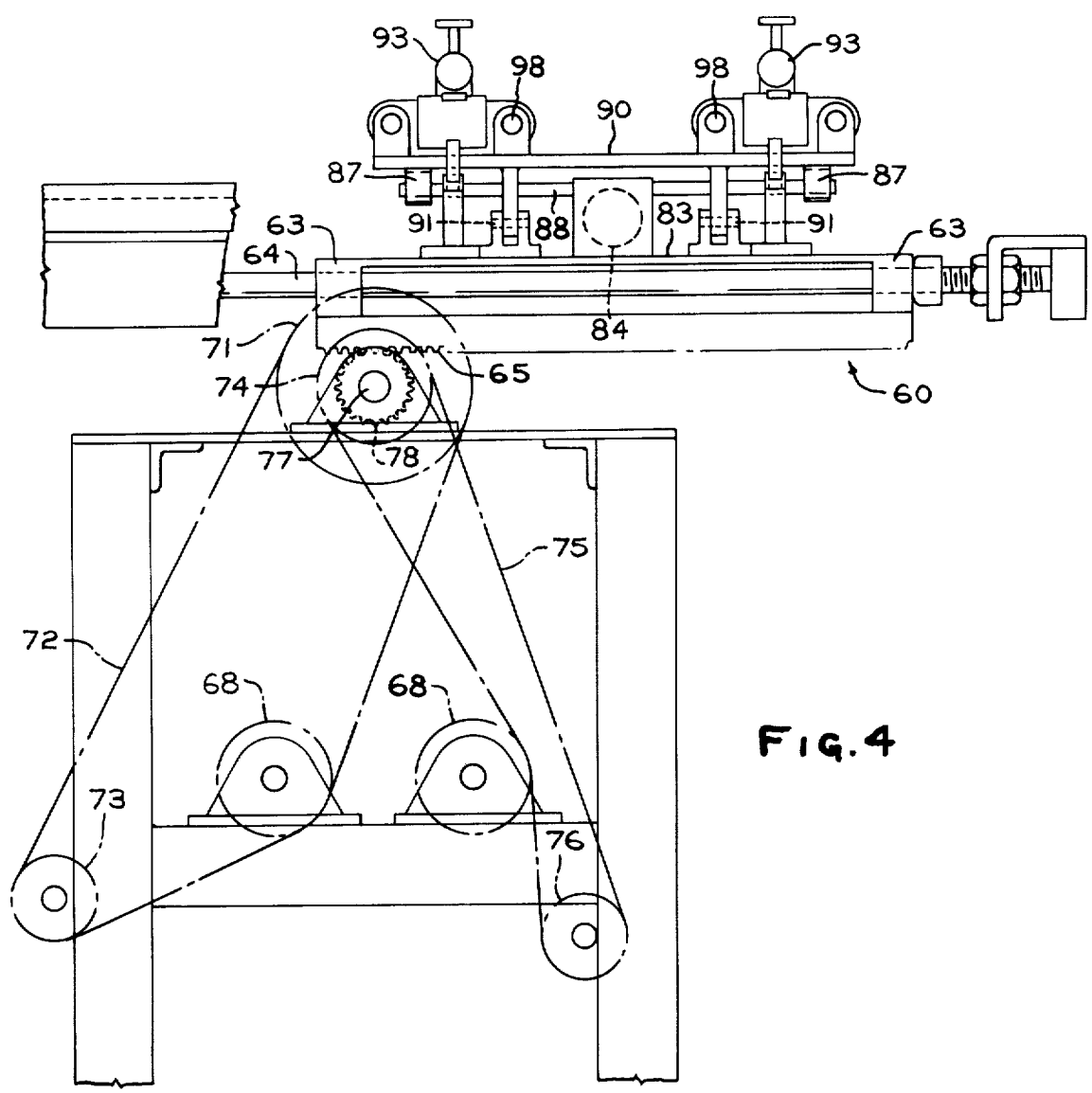
FIG. 4 is an enlarged view of an end of the glass alignment mechanism of FIG. 1, taken along the lines 4—4 of FIG. 3.
Figure 5:
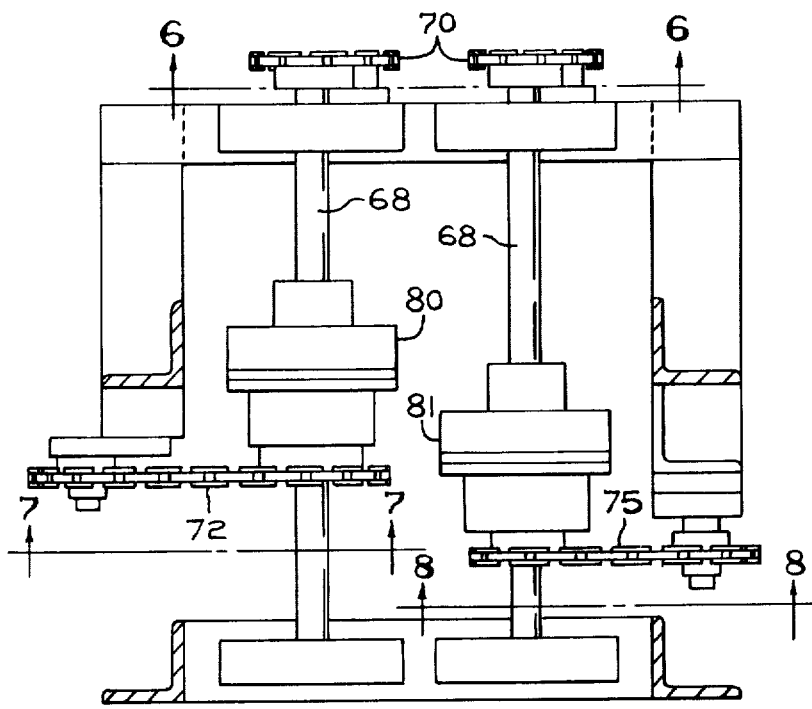
FIG. 5 is a plan fragmentary view of the various drive mechanisms for alternatively moving the glass aligning mechanism forward and backward with respect to the path taken by the glass sheets taken along the lines 5—5 of FIG. 3.
Figure 9:
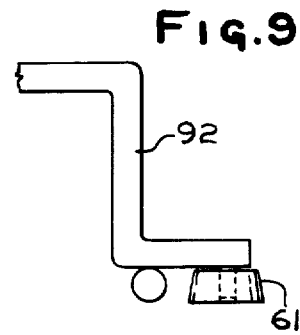
FIG. 9 is an enlarged view of the glass engaging member and the end of the supporting means for glass engaging member.

The apertured end brackets 63 form part of a support structure 83 for the transfer carriage 60. The rack 65 is supported on the under surface of the support structure 83. Referring especially to FIGS. 2, 3 and 4, the support structure 83 carries a piston cyclinder 84 which is pivotally mounted at one end on a clevis 85. A piston rod 86 for piston cyclinder 84 has its outer end portion connected to a pair of eccentric cams 87 through a rod 88 and linkage means 89. A table 90 is partly supported on a pair of pivots 91 and partly supported by the eccentric cams 87. The eccentric cams 87 are so constructed and arranged that when the piston rod 86 is extended, the eccentric cams 87 are rotated in a counterclockwise direction, as seen in FIG. 3, about pivot 91, to lift table 90.

A pair of superstructures 92 is mounted to the table 90. An adjustment screw 93 is provided for each superstructure 92 to adjust the position of the latter relative to the table 90. Each superstructure 92 is in the form of an angular finger that extends through a slot 82 in a side wall of furnace 20 and carries a glass engaging member 61 or 62 at its inner end. The adjustment screws 93 are adjustable independently of one another. As shown in FIG. 2, the screws 93 are adjusted in such a manner that upstream glass engaging member 61 can move laterally to a glass engaging position along line A—A while downstream glass engaging member 62 moves to a glass engaging position along line B—B when the respective cam followers 94 engage the innermost portions of cams 95.

The glass engaging members 61 and 62 are in the form of truncated cones rotatably mounted to the inner end portion of superstructure 92 about the axes of said truncated cones. Prior to this invention, the glass engaging members were in the form of discs, which wore at their peripheral edges that engaged the glass sheets during orientation and alignment. As the edges wore, they formed grooves that wedged the glass sheet edges against the conveyor rolls 25, thus causing the edges of the glass sheets to chip and to mark the lower surface of the glass sheets. By substituting truncated cones that slope upward in an inward direction at a small angle (preferably 3° to 5°) for discs, edge chipping and surface marking due to this factor has been reduced considerably.

A cam follower 94 is attached to the table 90 for superstructure 92. The cam followers 94 are constructed and arranged to engage the outer and inner surfaces of a pair of cams 95 and to pass through a pair of gates 96 pivoted to the upstream ends of cams 95 in response to the reciprocating movement of the transfer carriage 60. The cams 95 and gates 96 are of finite width and are supported on a suitable flat horizontal support structure 97 provided with a straight vertical fence 59 along its outboard longitudinally extending edge in laterally spaced relation to the outside of said cams 95 sufficient to allow the cam followers 94 to move therebetween. The fence 59 extends from upstream of the upstream gate 96 to downstream of the downstream cam 95 along a line laterally outward of the cams 95. The latter are rigidly secured to horizontal support structure 97 and the gates 96 are spring loaded against the fence 59, but yield in response to the movement of the cam followers 94 when the latter move with the transfer carriage 60 toward the upstream position.

The table 90 is provided with a pair of table rails 98, each of which receives a pair of ball bushings 99 attached to the superstructure 92 to facilitate adjustment of the superstructure 92 relative to its associated table 90. One of the table rails 98 for the table 90 is biased by a spring 100. This spring bias urges the cam followers 94 against inner surfaces of the cams 95 when the transfer carriage 60 moves toward its downstream position, and urges the cam followers 94 against the fence 59 when the carriage 60 moves toward the upstream position.

In a typical operation, a glass sheet G is loaded at the sheet loading station slightly to the side of its desired position of alignment toward the side wall of the furnace 20 that has the slot 19. Suitable guide means (not shown) may be provided at the loading station 12 to insure that each glass sheet is loaded onto the conveyor in a desired offset position that insures that the glass engaging members 61 and 62 will engage the glass sheet edge when the glass sheet G passes through the sheet orienting and alignment station 24.

The apparatus operates as follows. When the leading edge of a glass sheet G passes over the glass sensing mechanism 23 in the furnace 20, a timer circuit is actuated to initiate the following operations in synchronism with the establishing conveyor speed. When the glass sheet G is aligned with carriage 60, the timer actuates the forward clutch 80 to cause the carriage 60 to move from the upstream position at the same speed as the glass sheet G takes along the conveyor system 10. As the carriage moves downstream, the cam followers 94 follow the inner surfaces of the gates 96 and cams 95, thereby moving the respective upstream glass engaging member 61 and the downstream glass engaging member 62 into their respective glass edge engaging positions shown in FIG. 2. The lateral position that each glass engaging member occupies relative to its associated cam follower 94 is dependent of the lateral position that the other glass engaging member occupies in the glass engaging position because each adjusting screw 93 is independently operated to position the glass engaging members to enable the apparatus to orient and align glass sheets having irregular outlines or patterns. By the time the carriage has reached a position where the cam followers 94 engage the flat downstream portions of the inner surfaces of the cams 95, the glass edge engaging members 61 and 62 have come into momentary engagement with spaced points of engagement along the adjacent side edge of the glass sheet G. This assures that the glass is both aligned and oriented properly.

The carriage continues in the downstream direction until the front end brackets 63 reaches the downstream shock absorber 67 and compresses the latter. At that moment, the cam followers 94 reach the downstream end of cams 95 and the springs 100 urge the cam followers toward the fence 59. Also, clutch 80 is disengaged and the backward clutch 81 engaged to return the carriage 60 to its upstream position to await the arrival of the next glass sheet at approximately the same position it occupied for an immediately preceding glass sheet in a series to be processed on a mass production basis.

As the backward clutch 81 is energized, piston 84 extends the piston rod 86 to actuate the rod 88 to rotate eccentric cams 87 to tilt the table 90 upward, thereby lifting the glass engaging members 61 and 62 from the glass edge engaging plane depicted in solid lines in FIG. 3 to an upper position poised over the horizontal plane of the upper surface of the glass sheet G as depicted in phantom in FIG. 3. Piston rod 86 remains extended until after the transfer carriage 60 returns to the upstream position. As the carriage 60 is on its return trip to its upstream position, the cam followers 94 pass through the pivotable gates 96, forcing the upstream ends of the latter to pivot inward away from the vertical fence 59 until such time as the carriage 60 reaches its upstream position with the cam followers 94 upstream of the respective gates 96. At this time, both clutches 80 and 81 are inactive. When the next glass sheet is sensed, the piston rod 86 is retracted to actuate the rod 88 to rotate the eccentric cams 87 into position to tilt the table 90 downward so that the glass engaging members 61 and 62 are returned to a plane where they are capable of engaging the adjacent side edges of the next glass sheet that reaches the orienting and alignment station 24. However, the piston rod 86 may be retracted at any time after an oriented and aligned sheet passes beyond the sheet engaging members and before the latter reach positions in vertical alignment with predetermined lines of contact for engaging the adjacent edge of the next sheet to be handled at the orienting and alignment station 24.

Proper synchronization of the carriage and the control of piston rod 86 and clutches 80 and 81 makes it possible to align and orient at approximately the same location along the conveyor system between the upstream carriage position and the downstream carriage position. It is now possible to disengage the glass engaging members 61 and 62 from glass sheets of irregular outline as well as rectangular glass sheets by the rapid lifting provided by eccentric cams 87 to raise the glass engaging members 61 and 62 to a plane above the upper glass sheet surface when retracting the glass engaging members. It is now possible to avoid the problems of having misalignment or misorientation occur during the return run of the carriage after a glass sheet has been oriented and aligned properly during the forward motion of the carriage. Two spaced points of engagement along one side edge only is sufficient for proper orientation and alignment of a glass sheet immediately before it enters a processing station.

At the same time, since the actuating piston 84, clutches 80 and 81 and gates 96 are located outside the furnace, they are not subject to the furnace heat in the manner experienced by internally located actuating elements. Hence, the actuating elements have a longer life expectancy before requiring repair or maintenance. Also, when repairs or maintenance is needed, the furnace heat need not be disturbed and ready access is available to the actuating parts.

In a typical mass production operation in which a series of glass sheets is loaded in succession and conveyed through a furnace en route to a processing station such as the roll forming apparatus described above, the present invention makes it unnecessary to place each individual sheet on the conveyor in exactly the proper orientation and alignment required for entry into the processing station. The glass sheets may be mounted on the conveyor before the entrance to the furnace in only an approximation to the desired orientation and alignment and slightly to one side of its desired line of alignment.

The present invention makes it unnecessary to guide the sheets continuously as they traverse the entire length of the furnace. The present invention makes it unnecessary to touch the leading and trailing edges of the individual glass sheets at all. All the present invention requires is momentary simultaneous contact at two longitudinally spaced points along one edge only of each sheet in succession as near to the furnace exit as practical. Simultaneous contact at the two points by members having a component of motion in the direction of conveyor movement at the glass sheet speed and a component of motion transverse to the direction of conveyor movement from movement control means disposed outside the hot atmosphere of the furnace provides adequate orientation and alignment for high-speed mass production operations. In addition, the provision for lifting the glass engaging members when they are being retracted places the glass engaging members in positions above the upper glass sheet surfaces so that it is impossible for the members to contact and thereby misalign and misorient the glass even though the glass sheets move more rapidly than previously along the conveyor system 10.

The form of the invention described in this disclosure represents an illustrative preferred embodiment. It is understood that various changes such as changing the number of glass or sheet engaging elements, each provided with a superstructure and cams, or the use of limit switches instead of a timer circuit to initiate operation of the various actuating means that are synchronized according to the present invention, as well as other changes, may be made without departing from the gist of the invention as defined by the claimed subject matter that follows.

What is claimed is:

1. Apparatus for individually orienting and aligning each sheet of a series of thin, rigid, glass sheets moving rapidly in a given plane in an essentially straight path along a conveyor toward a sheet treating station where it is desired to have said sheet properly oriented and aligned relative to said sheet treating station, a sheet orienting and alignment station located to one side only of said conveyor and comprising:
   1. a carriage provided with a pair of sheet edge engaging members in the form of truncated cones whose outer walls are shaped upward and inward relative to the conical axes of said sheet edge egaging members, said carriage being mounted for movement in a reciprocating path parallel to and to one side of said essentially straight path,
   2. means to move said carriage downstream in unison with movement of each sheet in said series between an upstream position and a downstream position at a speed of movement of said sheet and to return said carriage to said upstream position at a more rapid speed,
   3. means to move said sheet edge engaging members laterally inward in a direction substantially normal to said conical axes to predetermined lines of engagement with the side of said sheet adjacent said glass edge engaging members in the plane occupied by said sheet during its movement as said carriage moves downstream, said glass engaging members causing less edge chipping and surface marking of the glass than that which results from orienting and aligning moving glass sheets with glass engaging members of cylindrical configuration, 4. means to retract said sheet edge engaging members from said predetermined lines of sheet edge engagement and means to lift said sheet edge engaging members above the plane occupied by said sheets after said sheet edge engaging members reach said predetermined lines of sheet edge engagement to avoid misaligning said previously aligned sheet by avoiding further contact therewith, and 5. means to lower said sheet edge engaging members into said plane in time for said carriage to receive the next rigid sheet at said upstream position and after the trailing edge of a previous sheet engaged during the previous downstream movement of said carriage has passed the positions occupied by said sheet edge engaging members.

2. Apparatus as in claim 1, wherein said outer walls are sloped at an angle of between about 3 and about 5 degrees.

3. Apparatus as in claim 1, wherein said means to move said sheet edge engaging members laterally inward comprises a cam associated with each said sheet edge engaging member and including an upstream cam and a downstream cam, a gate pivotally connected to the upstream end of each of said cams, and a cam follower connected to each of said associated sheet edge engaging members, and means to urge said cam followers against said cams as said carriage moves downstream.

4. Apparatus as in claim 3 wherein said cams are of finite width and further including a fence extending in laterally spaced relation outboard of said cams from upstream of said upstream gate to downstream of said downstream cam, whereby said means to urge said cam followers against said cams urge said cam followers toward said fence when said carriage moves downstream to a position where said cam followers are downstream of said associated cams so that said cam followers return to their respective upstream positions between said cams and said fence and through said gates when said carriage returns to its upstream position.

5. Apparatus as in claim 3, further including means to independently adjust the position of each of said sheet engaging members relative to its associated cam followers to enable said sheet engaging members to engage different portions of an edge of said sheet simultaneously when said portions are located along different lines of engagement.

6. Apparatus as in claim 1, wherein said means to lift said glass engaging members comprises a table supported on said carriage by pivot means and eccentric cam means, superstructure comprising a plurality of elongated finger means attached to said table, each supporting one of said glass engaging members at a free inner end thereof, and means operatively connected to said eccentric cam means to pivot said table about said pivot means to change the vertical position of said glass engaging members.

7. Apparatus as in claim 6, wherein said outer walls are sloped at an angle of between about 3° and 5°.

8. Apparatus as in claim 6, wherein said means to move said sheet engaging members laterally inward comprises a cam associated with each said sheet edge engaging member and including an upstream cam and a downstream cam, a gate pivotally connected to the upstream end of each of said cams, and a cam follower connected to each of said associated sheet edge engaging members, and means to urge said cam followers against said cams as said carriage moves downstream.

9. Apparatus as in claim 8, wherein said cams are of finite width and further including a fence extending in laterally spaced relation outboard of said cams from upstream of said upstream gate to downstream of said downstream cam, whereby said means to urge said cam followers against said cams urge said cam followers toward said fence when said carriage moves downstream to a position where said cam followers are downstream of said associated cams so that said cam followers return to their respective upstream positions between said cams and said fence and through said gates when said carriage returns to its upstream position.

10. Apparatus as in claim 8, further including means to independently adjust the position of each of said sheet engaging members relative to its associated cam follower to enable said sheet engaging members to engage different portions of an edge of said sheet simultaneously when said portions are located along different lines of engagement.

11. A method of handling individual glass sheets for subsequent treating in which a series of glass sheets is passed through an orienting and alignment station along a horizontal conveyor in an essentially straight path between an upstream position and a downstream position en route to a treating station where it is desirable that each of said sheets be oriented and aligned properly during said subsequent treating, comprising moving said sheets at a given linear speed in a downstream direction in a horizontal plane along said horizontal conveyor, moving at least two glass engaging members in the form of truncated cones whose outer walls are shaped upward and inward relative to their conical axes downstream at said given linear speed from said upstream position to said downstream position in alignment with and to one side only of one of said glass sheets while moving said glass engaging members inward transversely of said direction and substantially normal to their conical axes toward predetermined lines of contact with said glass sheet until said glass engaging members contact spaced portions along the adjacent edge of said glass sheet in said given plane to orient and align said moving glass sheet with less edge chipping and surface marking of the glass than that which results from orienting and aligning glass sheets by using glass engaging members of cylindrical configuration, retracting said glass engaging members from said lines of contact and lifting said glass engaging members above said given plane to avoid misaligning said previously aligned sheet by avoiding further contact therewith, returning said glass engaging members to said upstream position with said glass engaging members lifted above said given plane prior to the arrival of the next sheet in said series in alignment with said upstream position, and returning said glass engaging members to said given plane after said oriented and aligned glass sheet has passed beyond said glass engaging members and before said glass engaging members reach positions in vertical planes intersecting said respective predetermined lines of contact.

12. A method as in claim 11, wherein each glass sheet in said series is initially loaded onto said horizontal conveyor with said spaced edge portions to be contacted disposed in slight misalignment outward laterally of said conveyor relative to said respective lines of contact for said respective portions.

* * * * *